United States Patent [19]

Kopse et al.

[11] 4,394,823

[45] Jul. 26, 1983

[54] ELECTRICAL SIGNAL GENERATING FUEL INJECTION VALVE

[75] Inventors: Odon Kopse, Utzenstorf, Switzerland; Nestor R. Amaya, Stuttgart, Fed. Rep. of Germany

[73] Assignee: Robert Bosch GmbH, Stuttgart, Fed. Rep. of Germany

[21] Appl. No.: 311,052

[22] Filed: Oct. 13, 1981

[30] Foreign Application Priority Data

Oct. 30, 1980 [DE] Fed. Rep. of Germany ....... 3040811

[51] Int. Cl.[3] ........................................... G01M 15/00

[52] U.S. Cl. .................................... 73/119 A; 336/65

[58] Field of Search ............... 73/119 A; 336/65, 105; 200/DIG. 17

[56] References Cited

U.S. PATENT DOCUMENTS 4,362,051 12/1982 Schlagenhauf .................. 73/119 A

FOREIGN PATENT DOCUMENTS 898238 6/1962 United Kingdom ............ 73/119 A

*Primary Examiner*—Jerry W. Myracle

*Attorney, Agent, or Firm*—Frishauf, Holtz, Goodman, Woodward

[57] ABSTRACT

To positively retain a signal transducer coil within an insert ring, axially stacked on a fuel injection nozzle assembly, in which the induction coil provides an output signal upon axial reciprocating movement of the valve needle element of the injection valve, the opening is made large enough to receive a holding sleeve with an inwardly extending flange, the holding sleeve fitting over the induction coil and pressing the coil against the bottom wall of the opening. The holding sleeve, itself, preferably made of magnetic metal, is adhesively secured in the opening which, preferably, has a non-cylindrical shape, either extending conically or formed with a ring groove of, preferably, sawtooth cross section.

8 Claims, 2 Drawing Figures

FIG. 1
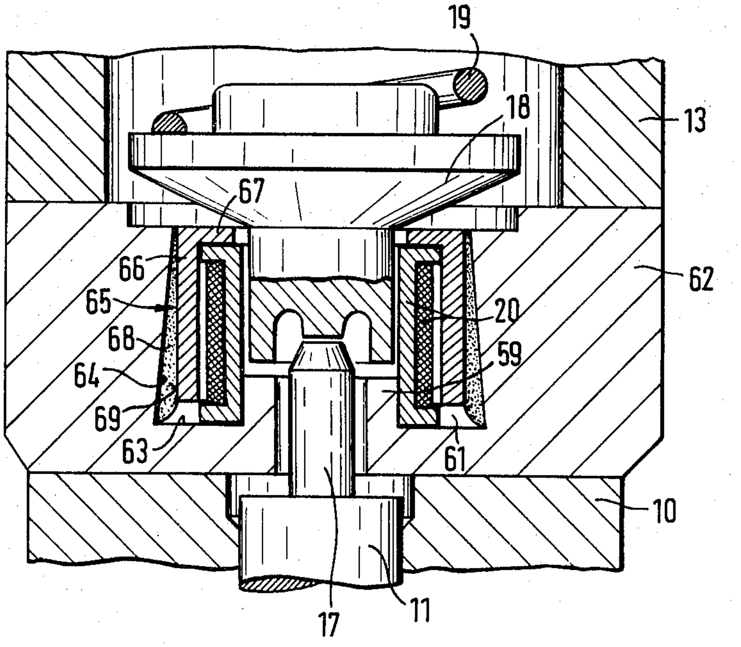
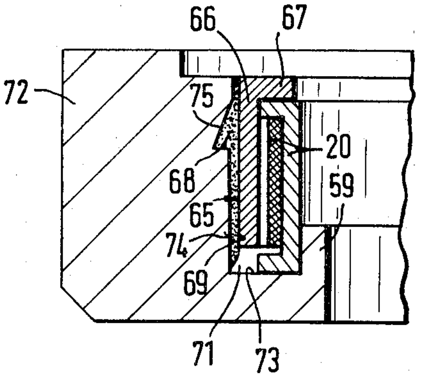
FIG. 2

ELECTRICAL SIGNAL GENERATING FUEL INJECTION VALVE

The present invention relates to a fuel injection valve, and more particularly to a fuel injection valve for Diesel engines which, when caused to operate, generates an electrical signal which can be used to determine proper operation of the valve, and its timing, for use in external evaluation or control circuitry.

BACKGROUND

Fuel injection valves of this type customarily use an induction coil which is positioned in an intermediate portion of the housing of the valve, typically an intermediate housing or retention ring. This facilitates assembly of the entire structure. Placing an induction coil element into such an intermediate ring weakens the ring, however, and, in some constructions, the portion of the bottom wall of the intermediate ring will become comparatively thin and will retain insufficient stiffness. The stiffness of the bottom wall of the ring can be improved by forming a reinforcement ring on the inside of the bottom wall. In spite of such a reinforcement ring, however, the situation may occur that the lesser stiffness of the ring causes separation of the induction coil from the cylindrical inner walls of the ring which retain the coil, thus interfering with operation of the induction coil as a signal source. Customarily, the induction coil is adhesively secured to the intermediate ring; the adhesive may become weakened and thus permit loosening of the coil or, in extreme cases, may result in an increased quantity of adhesives in undesired regions of the coil winding, with insufficient adhesive in other locations.

THE INVENTION

It is an object to improve a fuel injection valve with an electrical signal transducer element in form of an induction coil secured thereto which is reliable in operation and can be readily assembled.

Briefly, a holding sleeve is provided, for example of magnetic metal, which will then additionally form a magnetic return path for the coil and which has a cylindrical portion and an inwardly extending flange which is clamped in the intermediate ring to securely hold the induction coil within the opening provided therefor. The holding sleeve, then, can be adhesively secured to the insert ring.

The arrangement has the advantage that any accumulation of adhesives within the region of the winding of the induction coil itself is eliminated. The gap which is used for retention of adhesives is clearly defined, and an extended adhesion surface is provided. The coil itself is compressively retained in its predetermined position.

In accordance with a preferred embodiment, the ring gap formed in the insert ring to receive the retention sleeve is additionally provided with a groove or the like to receive additional adhesive; the groove may have sawtooth configuration for interlocking penetration by adhesive, or the relief formed in the insert ring to receive the retention sleeve can be tapered.

The quality and the composition of the adhesive must be matched to the materials to be adhered together. In accordance with a preferred embodiment of the invention, the retention sleeve is metal, which facilitates selection of the adhesives.

DRAWING:

FIG. 1 is a fragmentary axial view through the upper portion of a fuel injection valve for a Diesel engine illustrating only that part which retains the electrical transducer system; and FIG. 2 is a fragmentary view of the retention arrangement and illustrating a modification.

A fuel injection valve has a fuel injection body 10 within which a needle valve element 11 operates up and down. The valve opening, the needle valve element, and the like, all are not shown and can be in accordance with any standard construction. In the illustration of FIG. 10, the needle valve cone, injection nozzles, valve lifting chamber and the like are all positioned below the cut-off line as drawn in FIG. 1. The upper portion of the valve includes a housing element 13 which is coupled to the housing portion 10, for example by an outer sleeve, holding elements, extended portions which are rolled over a shoulder in the housing 10, or the like, or otherwise secured together. An insert ring 62 is positioned between the lower housing part 10 and the upper housing part 13. The insert ring 62 retains the transducer portion of the valve.

The needle valve shaft 11 has an extending composition pin 17 which is operatively connected to a compression element 18 which is spring-loaded by a spring 19. A ring-shaped inner extension 59 is formed on the insert ring 62 to surround the compression pin 17. This portion of the valve can be in accordance with customary and standard construction.

The intermediate ring 62 has a rotation symmetrical opening 61 therein. Opening 61 has a bottom wall 63 and side wall 64. Side wall 64, as shown in FIG. 1, is not cylindrical but extends outwardly conically towards the bottom wall 63.

In accordance with a feature of the invention, a retention sleeve 65, made of magnetic material, preferably of metal, is located in the opening 61. The retention sleeve 65 has an essentially cylindrical portion 66 and a radially inwardly extending flange 67. The sleeve 65 retains therein an induction coil 20, wound on a coil form in standard manner, which is fitted within the sleeve 65 such that the inner surface of the inwardly extending flange 67 presses the coil 20 against the bottom wall 63 of the opening 61. The retention sleeve 65 is adhesively secured in the opening 61. The adhesive 68 fills the gap or space between the outer wall surface of sleeve 65 and the wall of the opening 61. In cross section, this gap is approximately triangular. The inner wall of opening 61 and the outer wall of sleeve 65 are thus securely adhered together.

In the embodiment of FIG. 2, the opening is formed with cylindrical walls 74 into which a ring groove 75 is cut which, in cross section, is sawtooth-shaped, with the wider part facing downwardly, as seen in FIG. 2.

The retention sleeve 65 securely retains the induction coil 20 on the bottom wall 73 of the opening 71—see FIG. 2; adhesive 68 fills the region between the wall 74 in opening 71 and the outer wall 69 of the sleeve 65, as well as the sawtooth-shaped ring grooves 75.

Various changes and modifications may be made, and features described in connection with one of the embodiments may be used with the other within the scope of the inventive concept.

In a preferred embodiment, the insertion ring 62 is made of steel, and the retention sleeve 65 is made of machining steel 9 S Mn 28, according to the German Industrial standards DIN 1651. A suitable adhesive is epoxide resin.

A fuel injection valve, an illustrating portions not material to the present invention, is shown, for example, in the German 'Offenlegungsschrift' 29 32 480.

We claim:

1. Electrical signal generating fuel injection valve having a housing (10, 13);

a reciprocable needle valve element (11, 17) positioned in the housing;

an induction coil (20) positioned to surround the needle valve element so that, upon movement of the valve element, the reluctance of the electromagnetic circuit including the induction coil will change, thereby generating an electrical operating response signal, said housing including an insert ring (62, 72) formed with a central opening (61, 71) and having a bottom wall (63, 73) therein, in which opening the coil (20) is retained, and comprising, in accordance with the invention, a holding sleeve (65) having a generally cylindrical, axially extending portion (66) and a radially inwardly extending flange (67) joined to said axially extending portion, fitted in the opening (61, 71) of the insert ring (62, 72), the induction coil being positioned within the cylindrical portion (66) of the holding sleeve and pressed against the bottom wall (63, 73) of the opening (61, 71) by said flange (67).

2. Valve according to claim 1, wherein (FIG. 1) the wall (64) of the opening (61) within the insert ring (62) expands conically towards the bottom wall (63) thereof.

3. Valve according to claim 1, wherein (FIG. 2) the wall (74) of the opening (71) in the insert ring (72) is formed with a ring groove (75).

4. Valve according to claim 3, wherein the ring groove expands conically towards the bottom of the wall (73) of the opening.

5. Valve accordng to claim 4, wherein the ring groove, in cross section, is of sawtooth shape.

6. Valve according to claim 1, wherein the holding sleeve (65) comprises magnetic material.

7. Valve according to claim 6, wherein the holding sleeve comprises magnetic metal, and the insert ring comprise metal;

and an adhesive mass (68) filling a space between the inner wall (64, 74) of the opening (61, 71) and the outer wall of the cylindrical portion (66) of the holding sleeve.

8. Valve according to claim 1 or 2, further including an adhesive mass (68) positioned between the inner wall (64, 74) of the opening and the outer wall of the axially extending portion (66) of the holding sleeve (65).

* * * * *